March 14, 1961 S. ACKERMAN 2,974,531
ACCELEROMETER
Filed Aug. 1, 1957

INVENTOR
SUMNER ACKERMAN
BY Thomas S. Rose
Joseph R. Spalla
ATTORNEYS

2,974,531

ACCELEROMETER

Sumner Ackerman, East Walpole, Mass., assignor to Instrument Development Laboratories, Inc., Attleboro, Mass., a corporation of New York Filed Aug. 1, 1957, Ser. No. 675,604

4 Claims. (Cl. 73—516)

This invention relates to improvements in devices for measuring acceleration; more particularly it relates to a linear low frequency accelerometer having a very high output per unit acceleration; and specifically it relates to a linear low frequency accelerometer whose operation depends upon changes in the electrolytic resistance of an electrical circuit caused by a seismic element substantially buoyantly suspended in an electrolytic fluid.

Accelerometers are generally employed, as is well known, as design tools to analyze strains in a body under operating conditions. In order that the vibration characteristics of a body under investigation be not affected the size and weight of an accelerometer attached thereto must be negligible, and in addition it must be highly sensitive and accurate.

Diminutive accelerometers are presently known to the art. These accelerometers, particularly those designed to measure acceleration at low natural vibration frequencies, are subject to non-linearity and cross coupling errors because of the large deflections of the acceleration responsive element.

The accelerometer of the instant invention embodies a structure which is small, compact, rugged, highly sensitive and accurate. Non-linearity and cross coupling errors are eliminated through utilization of the principle of electrolytic conduction and the principle of buoyance. The structure comprises a hollow cylindrical casing filled with an electrolytic fluid. A conductive seismic element which serves as an electrode, and whose mass with respect to the fluid it displaces is predetermined, is mounted within the casing by a flexible conductive diaphragm which is suitably secured to the walls thereof. The mass of the element and diaphragm for the low frequency accelerometer is comparable to the mass of the fluid displaced thereby, whereby they are substantially buoyantly suspended in the electrolytic fluid between the upper and lower surfaces of the casing. A pair of electrodes in contact with the electrolytic fluid are mounted in the upper and lower surfaces of the casing and insulated therefrom. Movement of the seismic element which acts like the arm of a slide wire potentiometer varies the electrolytic resistances between the element and the pair of fixed electrodes.

In accordance with the invention the electrolytic potentiometer pick off enables linear measurements of acceleration at high natural vibration frequencies with high level outputs by utilizing a seismic element mass that is much larger than the mass of the fluid it displaces and enables linear measurements of acceleration at low natural frequencies without excessively large excursions of the seismic element, by utilizing a seismic element mass that is comparable to the mass of the fluid displaced by the seismic element.

It is an object of the present invention therefore to provide a small, compact and rugged accelerometer which has a high output per unit acceleration.

Another object of the invention is to provide a linear low frequency accelerometer for measuring wide ranges of acceleration at predetermined natural frequencies with concomitant high level outputs.

A further object of the invention is the provision of a highly sensitive linear low frequency accelerometer construction wherein errors due to cross coupling, angular acceleration and hysteresis are negligible.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
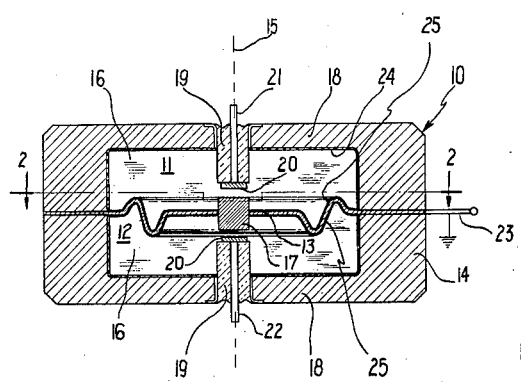
Fig. 1 is a cross sectional view showing the construction of an accelerometer in accordance with the invention.

Referring now to the drawings wherein like reference characters designate like or corresponding parts throughout the several views, there is shown in Fig. 1 a small, compact, hollow cylindrical casing generally designated by reference numeral 10 which may be formed from any suitable electrically conductive or non-conductive material. In a specific embodiment the casing diameter was 1½" and its height 11/16". The interior of the casing is divided into two chambers 11 and 12 respectively by a circular electrically conductive flexible copper diaphragm 13 which is secured about its periphery to the wall 14 of the casing and which is adapted to deflect substantially only along the axis 15 of the casing. For the purpose of clarity the annular bows in the diaphragm whereby it is made flexible are exaggerated. Both chambers are filled with a suitable electrolytic fluid 16 which serves to substantially buoy the seismic element and also as a damping fluid. Centrally mounted on the flexible diaphragm 13 is an electrically conductive seismic element 17 preferably of beryllium copper which functions as a third electrode.

As shown in Fig. 1 the top and bottom walls 18 are provided with axial openings wherein cylindrical insulating plugs 19 preferably formed from "Kovar" glass may be mounted and hermetically sealed therein. Electrodes 20 in the form of circular disks and preferably fabricated of copper, are secured to the internally facing ends of the plugs 19 in spaced relation to the seismic element. Terminal leads 21 and 22 to the electrodes extend through the glass plugs 19 and a ground terminal 23 is suitably connected to the diaphragm.

In the embodiment shown the casing 10 is formed of a suitable metal such as aluminum to provide a casing of greater strength, and in order that the flow of ions be limited between the electrodes 20 and seismic element 17 the surfaces of the metal casing and the diaphragm in contact with the fluid are electrically insulated. As seen in Fig. 1 the interior of the casing is coated with a suitable resinous insulating material 24 and the surfaces of the diaphragm are plated with a suitable insulating material 25 such as "Teflon."

Figure 2:
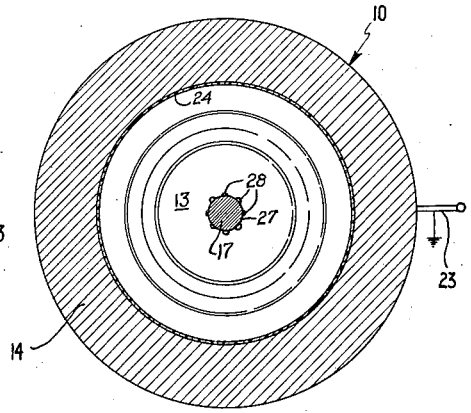
Fig. 2 is a sectional view of the diaphragm and seismic element taken along line 2—2 of Fig. 1.

Referring to Fig. 2 there is shown the manner of mounting the seismic element to the diaphragm. The seismic element 17 is placed within a central hole 27 in the diaphragm and secured therein by any suitable means so that equal portions of the element extend into chambers 11 and 12. Thereafter sections 28 of the diaphragm adjacent the seismic element are cut away thereby to permit laminar flow of the electrolytic fluid between chambers 11 and 12 as the seismic element 17 is displaced. The electrolytic fluid 16 filling the chambers is one which has the requisite viscosity, vapor pressure, density, chemical stability under operating conditions, and the ability to take compatible metallic salts. Electrolytic fluids with these characteristics and which were successfully employed in the instant accelerometer comprised alcohols in combination with soluble copper salts and preferably butyl or hexahydric alcohol.

Figure 3:
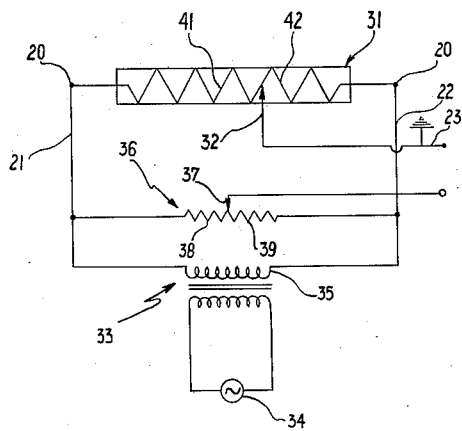
Fig. 3 is a schematic diagram of a measuring circuit with the electrical equivalent of the accelerometer connected in the circuit.

Referrring now to Fig. 3 there is schematically shown a circuit for measuring acceleration. The equivalent electrical circuit of the accelerometer takes the form of a slide wire potentiometer; the resistance element, which is generally designated by reference numeral 31, representing the fluid resistance between the electrodes 20, and the sliding arm 32 representing the seismic element. The accelerometer is energized from a transformer 33 connected to a suitable alternating current power source 34. The electrodes 20 are connected through their terminal leads 21 and 22 to the secondary 35 of the transformer and the seismic element arm 32 is connected to ground terminal 23. A zero balance potentiometer generally designated by reference numeral 36 is also connected across the secondary of the transformer as seen in Fig. 3. A suitable measuring instrument may be connected to the grounded seismic element arm 32 and to the movable arm 37 of the zero balance potentiometer. As is apparent the arrangement is a resistance bridge circuit comprising adjustable fixed resistances 38 and 39 and variable electrolytic resistances 41 and 42. Movement of the seismic element in response to forces of acceleration will increase the electrolytic resistance between the seismic element and one electrode and decrease the electrolytic resistance between the seismic element and the other electrode thereby unbalancing the resistance bridge and causing a measurable current to flow through an instrument connected across the terminals of the potentiometer arms 32 and 37.

Figure 4:
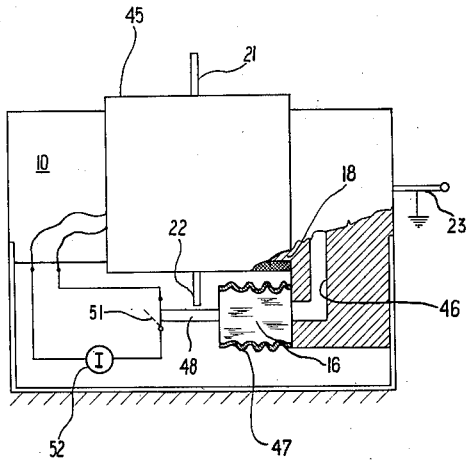
Fig. 4 is a partial cross sectional schematic view showing an accelerometer in accordance with the invention incorporating temperature control means.

In the specific embodiment disclosed experience has shown that optimum service life is obtained by maintaining the fluid at a predetermined temperature above ambient. Since chemical stability of the electrolytic fluid can fall off rapidly with temperature increases above said predetermined temperature, with the result that the damping and the bouyant characteristics of the fluid on which the calibration is dependent will change, a suitable form of temperature control is incorporated. Referring to Fig. 4 there is shown the structure of an accelerometer incorporating a temperature control system having heating coils generally designated by reference numeral 45 wrapped around the casing 10 for raising the temperature of the fluid therein to a predetermined value. In this embodiment an open passage 46 is provided in the bottom wall 18 of the casing whereby the fluid 16 within the chambers is in communication wtih a flexible bellows 47. The bellows is operatively attached to an arm 48 which is connected to actuate a normally closed snap action switch 51 connected in a series circuit with the heating coil 45 and a suitable current source 52. Increases in the temperature of the fluid above said optimum temperature will cause the bellows 47 to expand and thereby actuate the switch 51 to an open position. Opening of the switch will break the circuit to the heating coils 45, which circuit will remain open until the temperature drops below said optimum temperature.

The dynamic equation of motion of the system illustrated in Fig. 1 is a second order differential equation i.e.

(1)
$$\left(M_e + \frac{1}{2}M_f\right)\frac{d^2x}{dt^2} + K_1\frac{dx}{dt} + K_2 x = (M_e - M_f)\frac{d^2y}{dt^2} + \ldots$$

where:
$M_e$ = mass of the seismic element.
$M_f$ = mass of the fluid displaced by the seismic element.
$x$ = relative displacement between the seismic element and the casing.
$y$ = inertial axis displacement of the casing along the sensitive axis.
$K_1$ = viscous force constant.
$K_2$ = elastic force constant.
$(M_e + \frac{1}{2}M_f)$ = the mass that must be accelerated by forces applied to the element.

From Equation 1 are derived the following constants which characterize the static and dynamic characteristics of the accelerometer:

(2)
$$\text{Natural frequency, } \omega_0 = \sqrt{\frac{K_2}{M_e + \frac{1}{2}m_f}} \text{ in radians/sec.}$$

(3)
Damping factor, $\alpha$
$$= \sqrt{\frac{K_2}{4K_2\left(M_e + \frac{1}{2}m_f\right)}}; \text{ non-dimensional.}$$

(4) Static calibration, $K = \dfrac{M_e - m_f}{K_2}$; seismic element displacement per unit of acceleration input
$$\left(\frac{x}{g}\right)$$

From Equations 2 and 4 it may be seen that the displacement $(x)$ of the seismic element is equal to (5)
$$\frac{(M_e - M_f)}{\left(M_e + \frac{1}{2}M_f\right)}\frac{g}{\omega_0^2}$$

It is apparent that if the mass of the seismic element is much larger than the mass of the fluid displaced thereby, Equation 5 reduces to $$x = \frac{g}{\omega_0^2}$$

For high natural frequencies this displacement is reasonable and since output signal level is generally directly proportional to the displacement, the upper limits on the natural frequency are tied to the sensitivity of the accelerometer i.e. signal to noise ratio. For low natural frequencies of vibration however, the displacement/unit acceleration $$\left(\frac{x}{g}\right)$$

would be rather large. For example, for a natural frequency of 5 c.p.s. ($\omega_0 = 30$ rad./sec.).

$$x = \frac{g}{\omega_0^2} \frac{981 \text{ cm./sec.}^2}{900 \text{ rad.}^2/\text{sec.}^2} = 1.1 \text{ cm. or } x/g = 1.1 \text{ cm./g.}$$

This is a large displacement and it raises an almost insurmountable design problem with regard to the proper suspension of the seismic element whereby hysteresis and cross coupling errors may be reduced to a minimum, particularly in the design of a simple, compact and reliable instrument.

In accordance with the invention the seismic element mass is chosen to be susbstantially the same as the mass of the fluid displaced thereby. Considering Equation 5 again it is apparent that if the mass of the seismic element is made comparable to the mass of the fluid it displaces, i.e. approaching neutral buoyancy, the displacement per unit acceleration, $$x/g = \frac{(M_e - m_f)}{\left(M_e + \frac{1}{2}m_f\right)} \frac{1}{\omega_0^2}$$

will be small even at very low natural frequencies i.e. less than 10 c.p.s., thereby enabling the construction of a compact and accurate linear low frequency accelerometer.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. A linear low frequency accelerometer comprising a cylindrical casing, electrodes mounted on opposite sides of said casing along the axis thereof, an electrolytic fluid within said casing, a diaphragm, a third electrode suspended in said fluid by said diaphragm along the axis of said casing and between said oppositely mounted electrodes, openings in said diaphragm to permit laminar flow of said fluid in said casing, said third electrode having a mass only slightly greater than the mass of fluid it displaces whereby it is substantially buoyantly suspended, and circuit means connected to said electrodes.

2. A linear low frequency accelerometer comprising a hollow cylindrical casing, electrodes mounted axially of said casing in the top and bottom walls thereof, a conductive diaphragm secured to and dividing said casing into an upper and lower chamber, a conductive seismic element mounted centrally of said diaphragm between said electrodes, an electrolytic fluid filling said chambers, openings in said diaphragm adjacent said seismic element to permit laminar flow of said fluid between said chambers, the mass of said element being only slightly greater than the mass of said electrolytic fluid displaced thereby, whereby said element is substantially buoyantly suspended by said fluid, circuit means, and wire conductors connecting said electrodes and seismic element supporting diaphragm to said circuit means.

3. A linear low frequency accelerometer as recited in claim 2 wherein said casing comprises electrically conductive material internally coated with an insulating material, and wherein said diaphragm is coated with an insulating material.

4. A linear low frequency accelerometer comprising a hollow cylindrical casing, a circular elastic electrically conductive diaphragm connected about its periphery to and dividing said casing into an upper and a lower cylindrical chamber, an electrolytic fluid within said chambers, disc electrodes extending into said fluid mounted in the upper and lower walls of said casing on the axis thereof, a cylindrical conductive seismic element centrally mounted on said diaphragm between said wall mounted electrodes, a plurality of openings in said diaphragm formed about the periphery of and adjacent said element to permit laminar flow of said fluid between said chambers as said element is displaced, said diaphragm within said casing being insulated from said fluid whereby ion flow is directed between said electrodes and element, said element having a mass only slightly greater than the mass of the electrolytic fluid displaced thereby, and circuit means connected to said diaphragm and electrodes.

References Cited in the file of this patent

UNITED STATES PATENTS

| | | |
|---|---|---|
| 2,032,417 | Jacobs | Mar. 3, 1936 |
| 2,271,531 | Minor | Feb. 3, 1942 |
| 2,387,223 | Carson | Oct. 16, 1945 |
| 2,397,962 | Hartz | Apr. 9, 1946 |
| 2,411,117 | Scherbatskoy | Nov. 12, 1946 |
| 2,440,605 | Hathaway | Apr. 27, 1948 |
| 2,643,869 | Clark | June 30, 1953 |
| 2,665,896 | Kirby et al. | Jan. 12, 1954 |
| 2,677,270 | Sanderson | May 4, 1954 |
| 2,778,624 | Statham | Jan. 22, 1957 |
| 2,840,366 | Wing | June 24, 1958 |

FOREIGN PATENTS

| | | |
|---|---|---|
| 316,171 | Germany | Nov. 22, 1919 |
| 721,490 | Germany | June 6, 1942 |